(12) United States Patent
Hugenberg (10) Patent No.: US 11,266,066 B2
(45) Date of Patent: Mar. 8, 2022

(54) BELT LOCK AND BELT

(71) Applicant: Ricon GmbH & Co. KG, Rieste (DE)

(72) Inventor: Ansgar Hugenberg, Holdorf (DE)

(73) Assignee: Ricon GmbH & Co. KG

( * ) Notice: Subject to any disclaimer, the term of this patent is extended or adjusted under 35 U.S.C. 154(b) by 0 days.

(21) Appl. No.: 16/944,738

(22) Filed: Jul. 31, 2020

(65) Prior Publication Data

US 2021/0029870 A1    Feb. 4, 2021

(30) Foreign Application Priority Data

Aug. 2, 2019 (DE) .......................... 202019104274.5
Aug. 29, 2019 (DE) .......................... 202019104761.5

(51) Int. Cl.
| | | |
|---|---|---|
| *A01D 17/10* | (2006.01) | |
| *B65G 15/52* | (2006.01) | |
| *F16G 3/02* | (2006.01) | |

(52) U.S. Cl.
CPC .............. *A01D 17/10* (2013.01); *B65G 15/52* (2013.01); *F16G 3/02* (2013.01); *A01D 2017/103* (2013.01)

(58) Field of Classification Search
CPC ........... B65G 15/52; A01D 17/10; F16G 3/00; F16G 3/02; F16G 3/04; F16G 3/08; F16G 3/09
See application file for complete search history.

(56) References Cited

U.S. PATENT DOCUMENTS

| | | | | |
|---|---|---|---|---|
| 1,895,969 | A * | 1/1933 | Alexander | ................ F16G 3/02 24/33 B |
| 2,898,652 | A * | 8/1959 | Ireland | ...................... F16G 7/00 24/33 M |
| 4,344,209 | A | 8/1982 | Harwood | |
| 4,815,587 | A | 3/1989 | Musil | |
| 5,099,548 | A | 3/1992 | Loosli | |
| 5,360,103 | A | 11/1994 | Loosli | |
| 9,320,194 | B2 * | 4/2016 | Dettmer | ................ B65G 17/00 |
| 2004/0195079 | A1 | 10/2004 | Webster et al. | |
| 2016/0229575 | A1 | 8/2016 | Lapointe | |

FOREIGN PATENT DOCUMENTS

| | | |
|---|---|---|
| DE | 513389 C | 11/1930 |
| DE | 2508101 A1 | 9/1975 |
| DE | 29716333 U1 | 1/1998 |
| DE | 102013013446 B3 | 2/2015 |
| FR | 1211432 A | 3/1960 |
| FR | 3058707 A1 | 5/2018 |
| WO | 2007068219 A1 | 6/2007 |

* cited by examiner

*Primary Examiner* — William R Harp
(74) *Attorney, Agent, or Firm* — Husch Blackwell LLP (57) ABSTRACT

A belt lock for a belt for an agricultural implement is provided. The belt lock comprises two connecting pieces which may be connected via a lock pin. The two connecting pieces each have an upper part and a lower part which are configured integrally with a hinge region, forming a receiver for the lock pin and for at least partially arranging one respective belt end between one another. The upper and lower part in each case have at least one recess for arranging a fastener. Each of the upper and lower parts have a belt adapter which is arranged on the respective connecting piece, the respective belt end being able to be releasably connected thereby to the respective connecting piece.

14 Claims, 7 Drawing Sheets

BELT LOCK AND BELT

CROSS-REFERENCE TO RELATED APPLICATIONS

This application claims priority to German Application No. 20 2019 104761.5, filed Aug. 29, 2019, as well as German Application No. 20 2019 104274.5, filed Aug. 2, 2019, the entirety of both of which are hereby incorporated by reference.

FIELD OF THE INVENTION

The present invention relates to a belt lock for a belt for an agricultural implement, in particular a root crop harvesting or transport machine, comprising two connecting pieces which may be connected via a lock pin and which in each case have an upper part and a lower part, wherein the upper part and lower part are configured integrally with a hinge region forming a receiver for the lock pin and for receiving one respective belt end between one another and, in particular, wherein the upper part and lower part in each case have at least one recess for arranging fastening means. The invention further relates to a belt for an agricultural implement having a belt lock as described above.

BACKGROUND

Belt locks disclosed in the prior art, for example in DE 29716333 U1, are only able to be replaced with difficulty in the case of the wear thereof. Individual fastening means in the form of one or more rivets have to be released in order to replace the connecting pieces which are secured to the respective belt ends to be connected together. The belt ends then have to be inspected in order to check to what extent the rivets may be re-attached at the same points.

It is further disclosed in the prior art to use screw connections instead of the rivets, the handling thereof however being awkward for different reasons. By screwing through the belt, residues of plastics material are deposited in the screw thread so that the screws are not necessarily able to be fully mounted. Moreover, the screws which are used are provided with nuts which are arranged on the lower face, i.e. toward any running surfaces of the belts, and which are relatively frequently damaged and able to snap off during operation.

Finally, many of the known belt locks additionally have bushings which are poorly visible from the outside and thus the wear state thereof is not able to be properly checked.

BRIEF SUMMARY OF THE INVENTION

It is the object of the present invention to improve a belt lock and/or a belt having a corresponding belt lock relative to the aforementioned drawbacks.

A belt lock according to the invention in each case has a belt adapter which is arranged on the respective connecting piece, the respective connecting piece being able to be releasably connected thereby to the respective belt end. Whilst the respective belt adapter may be fixedly connected to the belt end, and thus remains in its position on the belt end, the hinge region which is particularly susceptible to wear may be replaced and/or checked relative to its wear in a simple manner, without the actual connection to the respective belt end having to be released. With the arrangement and securing of the belt adapter to the respective belt end, the releasability thereof does not have to be taken into account for the purpose of replacement and the belt adapter may be optimally fastened.

Hereinafter, for the sake of simplicity reference is frequently made to one connecting piece with the respective belt adapter and the respective belt end. It goes without saying that the respective design may also apply to the other connecting piece on the other belt end.

The hinge region comprises, in particular, those regions of the belt lock in which the parts of the belt lock which bear against one another move relative to one another during the operation of the belt.

In particular, the connecting piece is releasably, preferably manually releasably, fastened to the belt adapter via a sleeve nut-threaded screw combination. Instead of releasable screw connections in which, in particular, both the sleeve nut and the threaded screws may be countersunk in the connecting piece so as not to generate any raised portions hindering the running of the belt, latching solutions may also be used, the connecting piece being connectable thereby to the belt adapter. The releasability may also be achieved by combinations of screwable and latchable fastening means.

In order to have sufficient constructional space for the belt lock according to the invention, any protruding projections of the belt may be reduced and/or removed in terms of the height thereof, so that the belt lock according to the invention does not have a higher construction than the remaining protruding regions of the belt. At the same time, the belt adapter may follow the profile of one belt side for the purpose of improved securing thereto.

Preferably, bolt-shaped or pin-shaped connecting elements, in particular a correspondingly shaped end of a bar, for example a screening bar, may be used as the lock pin, so that additional separate lock pins may be dispensed with.

In particular, the belt adapter has at least one planar adapter element, in particular an adapter plate, the belt end being able to be arranged on one side thereof, whilst the upper or lower part of the connecting piece is arranged on a further side remote from this side. Such a planar element thus bears against the belt end in order to create therewith an at least partially frictional connection and also has regions against which the connecting piece bears. In this case, the connection to the connecting piece may be implemented both by a frictional and a positive connection. Particularly preferred is a combination in which, on the one hand, a planar bearing is implemented between the connecting piece regions of the upper or lower part, in particular the inner faces thereof, and, on the other hand, a further connection is implemented via additional fastening means.

In particular, the belt lock is provided with a belt adapter which has planar adapter elements, in particular adapter plates, which may be arranged on two sides of the belt end remote from one another, and these adapter plates are configured for arranging and securing the belt end therebetween.

The belt end may be clamped between the adapter elements, wherein the adapter elements on their outer faces form bearing regions and fastening regions for one respective connecting piece. These adapter elements are thus arranged, in particular, at least partially between the inner faces of the upper and/or lower part of the respective connecting piece and releasably fastened thereto. The upper and lower part in this case, in particular, are regions of the connecting piece which do not form a through-passage for the lock pin and, in particular, are arranged on the sides of a belt end facing away from one another. In individual cases, the upper and lower part may also be partially arranged on the front end of a belt end. In particular, the upper and lower part are regions of the integrally configured connecting piece, a part of the belt end still being arranged therebetween.

The adapter element is planar when the length thereof in the longitudinal direction of the belt end is greater than the extent of the adapter element transversely thereto.

For improved bearing against the belt end and/or for improved securing thereto, the adapter plate is preferably provided with an angled-back region. Such an offset in the adapter plate enables said adapter plate to bear in an improved manner against projection-like regions of the belt end. Moreover, via such a step a constriction is formed in the belt, so that a positive connection is produced instead of a frictional connection. Preferably, this angled-back region is a part of the adapter plate facing away from the front end of the belt end to be secured. The angled-back region may also be partially curved so that a movement of the belt end does not permit said belt end to rub against sharp corners or edges of the adapter plate.

In particular, the adapter plate is configured as a bar-shaped adapter plate which may be secured to the belt end, a bar being able to be arranged in turn thereon. Preferably, the bar is arranged on an angled-back region and in the fastening position on the belt end is encompassed on the outer face by the adapter plate.

The upper and lower part are preferably spaced apart from one another. However, the upper and lower part may also be connected together by individual stabilizing struts or projections and/or form receivers for correspondingly shaped parts of the belt adapter. Preferably, the upper and lower part and the at least one adapter element have recesses which are aligned with one another for arranging fastening means. Thus, for example, the connecting piece may be fastened at the same time with its upper and lower part.

A belt lock including a planar adapter element for the purpose of securing the belt adapter to the respective belt end comprises, in particular, a clamping plate, an adapter plate being able to be clamped thereby to the belt end and/or the connecting piece. Such a clamping plate, which has a length which preferably corresponds approximately to the transverse extent of the belt end to be clamped, distributes potential clamping forces in a particularly effective manner via the adapter plate and/or adapter element.

For the purpose of improved securing of the belt adapter to the respective belt end, the belt adapter has at least one tooth element facing in the direction of a belt end to be arranged. By clamping or screwing the belt adapter to the belt end, such tooth elements are able to be forced into the material of the belt and thus effect an additional protection against wear and an additional securing of the belt adapter in the longitudinal direction of the belt. For example, such tooth elements may be produced by an oblique triangular stamped portion, wherein the belt adapter, in particular, consists of a steel material.

During the use of two adapter plates, preferably both adapter plates have tooth elements facing in the direction of the belt. Alternatively, only one of the adapter elements has a plurality of tooth elements. The tooth elements are arranged, in particular, adjacent to one another and transversely to the longitudinal extent of the belt and adjacent to recesses of the adapter plate for arranging fastening means. As a result, the belt material is compressed in the belt regions which are particularly subjected to tensile forces exerted by potential fastening means, so that the forces may be introduced more effectively into the belt material.

The adapter plate may have a recessed region for the purpose of receiving the connecting piece, at least parts of the connecting piece being able to be introduced and/or inserted therein. As a result, the mounting is simplified and a secure fit of the connecting piece on the belt adapter and/or vice versa is possible. Similarly, the belt adapter may have a recessed region for receiving the belt, in particular on its side to be turned toward the belt. Such a pocket-like region or such a recess serves for arranging belt material which may move into this region when the belt adapter is clamped against the belt, in order to ensure an improved and safer fit relative to the belt adapter being pulled out from the belt end.

One end and/or edges of the belt adapter may be configured to be curved and thus protect the belt, in order to maintain the integrity of the belt material as long as possible. In particular, the flexion of a curved-back end corresponds to the maximum flexion of the belt, so that in the deflection regions this belt may correspondingly bear against an end of the belt adapter and/or the adapter plate.

The hinge region of the belt lock according to the invention is configured, in particular, without a bushing. Due to the simple means for changing the connecting piece, this connecting piece may be configured from a suitable and, in particular, softer metal than the belt adapter in order to ensure, on the one hand, a good mobility of the bar in the belt lock and a specific point of wear. Wear may be easily identified and the belt lock is configured to be optimized in terms of wear.

Preferably, the connecting pieces of a belt lock are configured identically and are configured as F-type connecting pieces. In other words, in a view from below for example, the connecting pieces are F-shaped and have a hinge region which is configured by two correspondingly curved strip regions or strips. Thus, a further connecting piece may be arranged twisted between and/or adjacent to these curved regions so that over the entire width of a belt lock four curved strips which correspond to the respective hinge region of the respective connecting pieces are penetrated by a bar.

The object set forth in the introduction is also achieved by a belt for an agricultural implement which comprises a belt lock as described above or below. In this case, a belt end is at least partially fastened between the upper and lower part, wherein the two connecting pieces are connected together, in particular, via a bar end. The belt adapters which are respectively arranged on one of the two belt ends are arranged, in particular, between the inner face of the respective upper and lower part and the respective belt end and have a releasable fastening to the respective connecting piece.

In the longitudinal direction of the belt, the length of the belt adapter is preferably less than the spacing between two successive screening bars so that in addition to a fastening of a screening bar via the connecting adapter, a sufficient flexibility is maintained so as not to impair the running of the belt, in particular, in the deflection regions.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Individual technical features of the exemplary embodiments described below may also be combined together with the above-described exemplary embodiments and the features of the independent claims and any further claims to form objects according to the invention. If expedient, elements which have the same function are provided with identical reference numerals.

Figure 1:
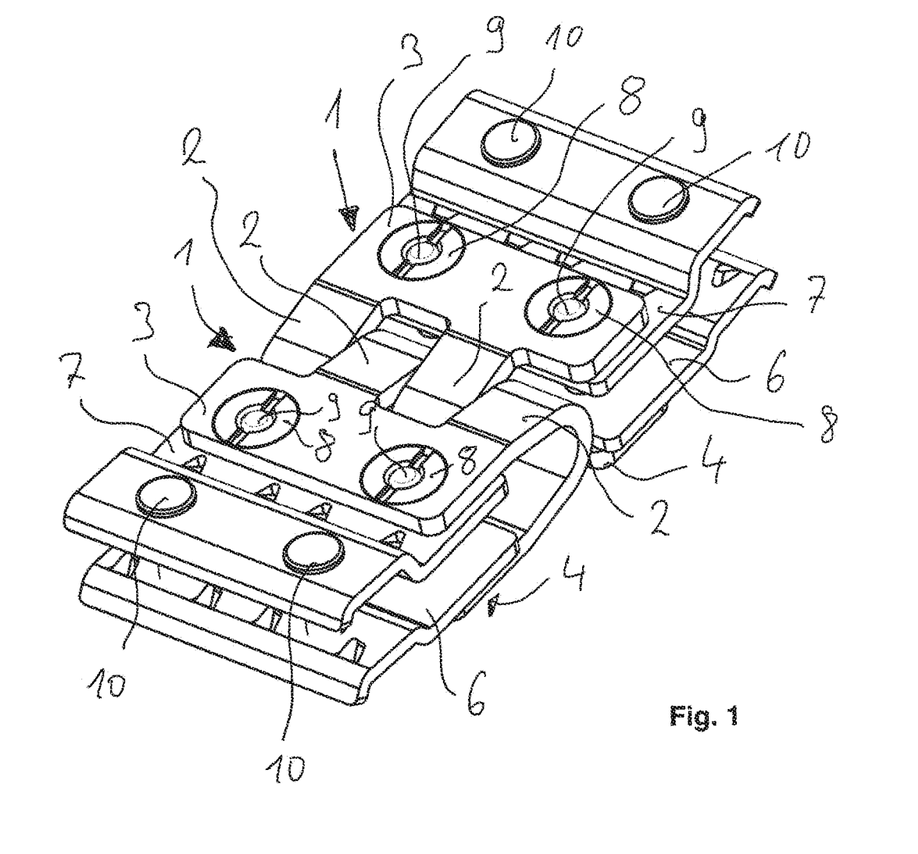
FIG. 1 shows an object according to an example embodiment of the invention in a perspective view.

According to FIG. 1, a belt lock according to the invention has two connecting pieces 1 which are partially arranged in one another and on one another as F-type connecting pieces (in plan view an F-shape is produced). The curved strips 2 connect one respective upper part 3 of one respective connecting piece 1 integrally to one respective lower part 4. On the inner face of the upper part 3 and the lower part 4 a belt adapter comprising two adapter plates 6 and 7 is assigned to each connecting piece, the connecting pieces being able to be arranged thereby on the respective belt ends, not shown.

The upper part 3 and the lower part 4 and the upper adapter plate 7 and the lower adapter plate 6 have recesses aligned with one another for arranging fastening means 8, 9 and 10. By means of the fastening means 8 and 9 the connecting pieces 1 are releasably connected to the belt adapter and/or the two adapter plates 6, 7 thereof.

The fastening means 8 in the present case is configured as a sleeve nut which may be countersunk in the upper part 3, the upper edge thereof running conically. Accordingly, the recess covered by the sleeve nut 8 also tapers. The fastening means 9 which is configured as a threaded screw is located in the thread of the sleeve nut 8.

In order to form a non-releasable connection between the belt end, not shown, and the belt adapter, fastening means 10 which are configured as rivets are used (FIG. 1).

Figure 2:
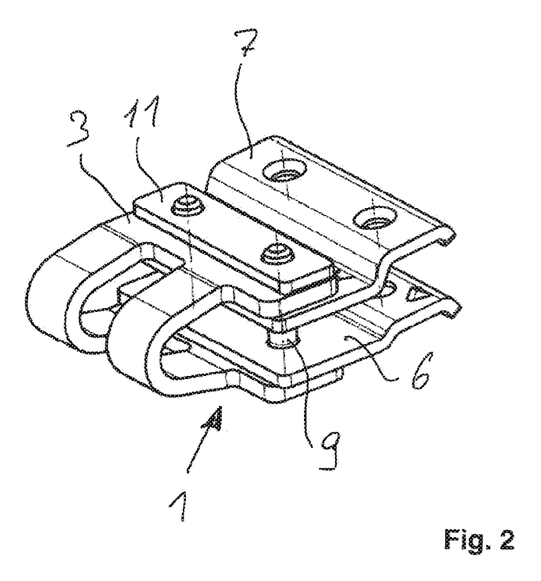
FIG. 2 shows a connecting piece of a further object according to an example embodiment of the invention.
Figure 3:
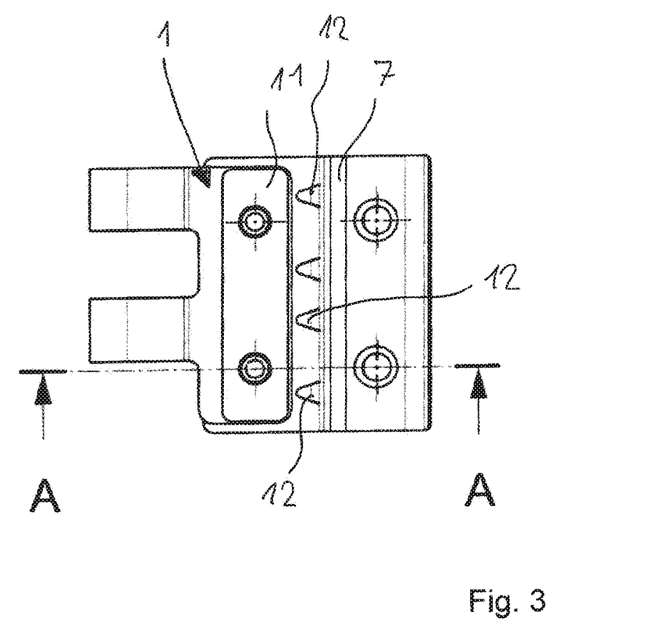
FIG. 3 shows the object according to FIG. 2 in a plan view.

In the exemplary embodiment according to FIGS. 2 and 3 only a part of a belt lock comprising the connecting piece 1 and a belt adapter is shown. In the present case, the connecting piece 1 is clamped against the adapter plate 7 by means of a clamping plate 11. The clamping plate 11 has recesses in which a fastening means 9, also configured as a threaded screw, is arranged, said fastening means nevertheless being able to be configured differently from the fastening means 9 in FIG. 1. The clamping plate 11 has on its lower face, not shown in FIG. 2, raised portions which engage in corresponding recesses of the upper part 3 and ensure an optimal fit of the clamping plate 11 on the connecting piece 1. Thus, on the one hand, the clamping plate 11 is used to ensure the releasable connection of the adapter plates 6 and 7 to the connecting piece 1 but at the same time a clamping is implemented thereby of the belt end, not shown, to be arranged between the adapter plates 6 and 7, and thus a securing of the adapter plates 6 and 7 to the belt end is also implemented thereby.

Additionally, both the upper adapter plate 7 and the lower adapter plate 6, not shown in the figure, comprise a series of tooth elements 12, resulting in the adapter plate 7, when fastened to the belt end, digging into the material of the belt. For example, the tooth elements 12 have been produced by stamping into the metal of the adapter plate 7 (FIG. 3).

Figure 4:
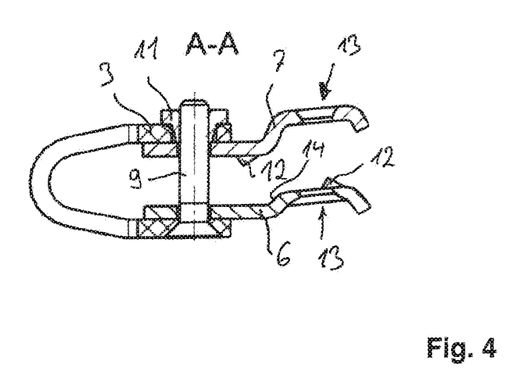
FIG. 4 shows a cross-section of the object taken across line A-A in FIG. 3.

Whilst in the upper adapter plate 7 the tooth elements 12 are arranged in the left-hand lower region shown in FIG. 4 and not in an angled-back upper region, the lower adapter plate 6 has the tooth elements 12 in the upper region adjacent to the adapter plate recesses 13 for passing through fastening elements. The action on the belt material is thus distributed over the region of the belt end in the longitudinal direction of the belt. Due to its upper angled-back portion, the upper adapter plate 7 is formed at the same time as a bar adapter plate, i.e. the offset of the right-hand upper end, which is provided with the adapter plate recess 13, is sufficiently great that a bar which is preferably configured as a screening bar may also be arranged at that point between the adapter plate 7 and the belt end.

The angled-back region of the lower adapter plate 6 is smaller in terms of shape. By means of an edge 14 the adapter plate is able to bear against a projection which rises only slightly over the thickness of the remaining material of the belt end (see FIG. 6) and thus produce an additional resistance against the belt adapter being pulled off the belt end.

Also to be seen in FIG. 4 is the shape of the clamping plate 11 which with its lower end forms a type of threaded sleeve which engages in the recess of the upper part 3.

Figure 5:
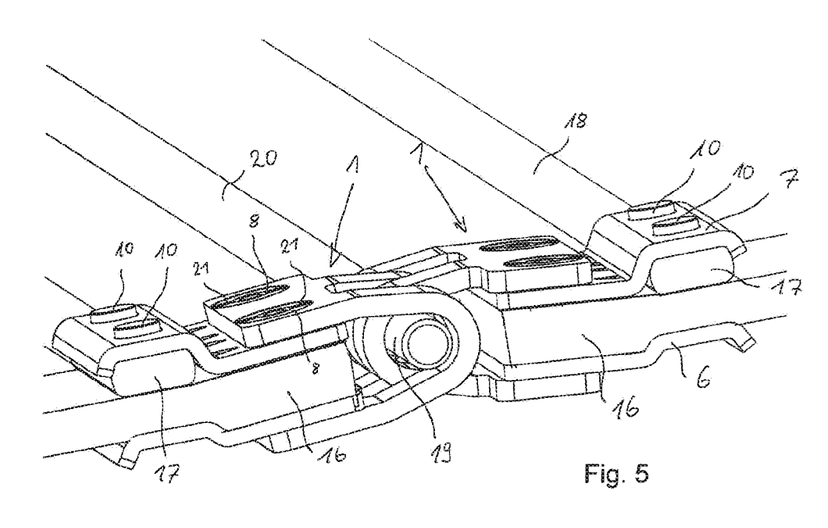
FIG. 5 shows a further object according to an example embodiment of the invention in a partial view in an operating position.

The arrangement of a screening bar between the belt end 16 and upper adapter plate 7 of the belt adapter is shown in FIG. 5. Flattened end regions 17 of the respective screening bars 18 are arranged between the angled-back upper region of the adapter plate 7 and the belt end 16. Fastening means 10 in the form of rivets are able to fasten simultaneously the two adapter plates 6 and 7 and the screening bar 18 to the belt in one working step in a riveting machine. Both the simple replacement of the connecting pieces 1 and the use of a bar end 19 of a screening bar 20 as a lock pin are readily possible by means of the releasable fastening means 8 and 9. In the case of wear of the hinge region of the connecting piece 1, this relatively useful part may be simply manually released and replaced. In order to avoid protruding nuts, the fastening means 8, which is configured as a threaded sleeve, has indentations 21 on the outer face for securing the torque applied for the screw connection.

Figure 6:
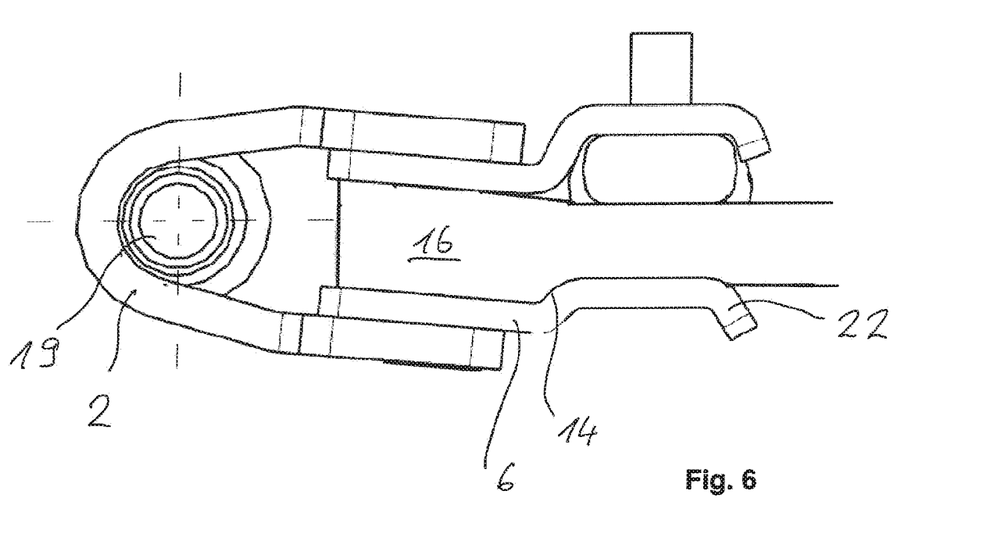
FIG. 6 shows the object according to FIG. 5 in a partial view.

It may be seen, in particular, in FIG. 6 that a downwardly thickened and projection-like region of the belt end 16 bears against the edge 14 of the lower adapter plate 6. One end 22 of the adapter plate 6 leading away from the belt end is configured to be curved in order to avoid rubbing of the material and to protect the belt end, with the circulation of the belt and thus the flexion associated therewith in the deflection regions.

The curved strips 2 are adapted in terms of the curvature thereof to the radius of the bar end 19 of the screening bar 20 so that additional bushings no longer have to be used.

Figure 7:
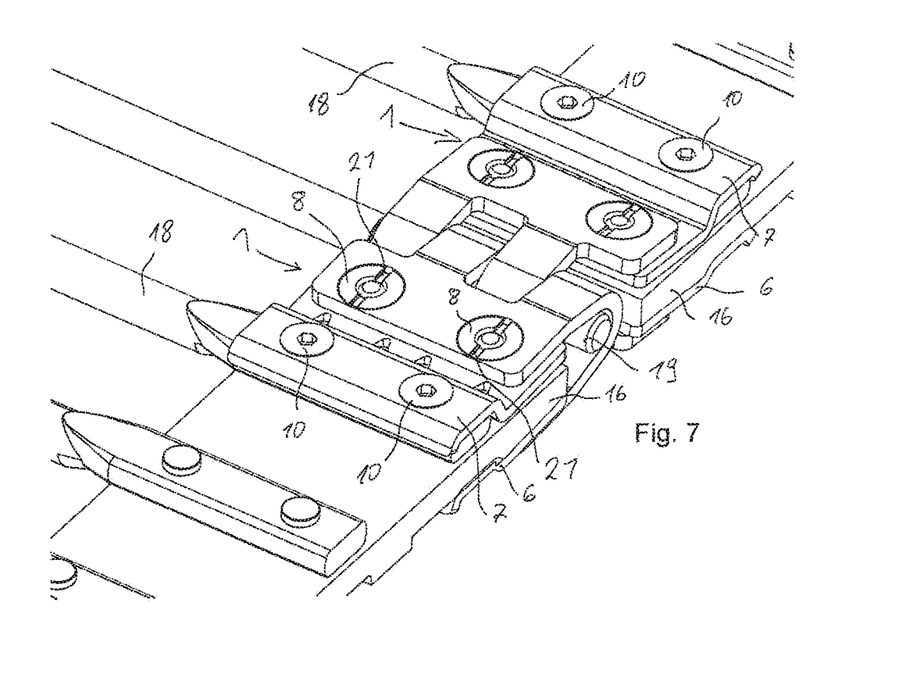
FIG. 7 shows a further object according to an example embodiment of the invention.

According to the exemplary embodiment according to FIG. 7, instead of rivets as fastening means 10, screws may also be used for securing a screening bar 18 to the belt, said screws preferably being countersunk in the upper adapter plates 7 and on the lower face, not shown in the figures, being screwed to mating parts, for example in the form of countersunk sleeve nuts or threaded plates.

The invention claimed is:

1. A belt lock for a belt for an agricultural implement, the belt lock comprising:
   two connecting pieces, each having an upper part and a lower part which are configured integrally with a hinge region forming a receiver;
   a lock pin receivable by the receiver for selectively connecting the two connecting pieces;
   wherein the upper part and the lower part are configured for at least partially arranging one respective belt end therebetween,
   wherein each respective upper and lower part have at least one recess for arranging fastening means,
   wherein a belt adapter is selectively releasably arranged on each respective connecting piece, the respective belt end being releasably connected thereby to the respective connecting piece, the belt adapter including at least one rigid adapter plate extending generally in a plane;
   wherein the belt end being arrangable on one side of the at least one adapter plate, whilst the upper or lower part of the connecting piece is arranged on another side remote from the one side thereof; and
   wherein the adapter plate has an angled-back region.

2. The belt lock as claimed in claim 1, wherein the connecting piece is releasably fastened to the belt adapter via a sleeve nut-threaded screw combination.

3. The belt lock as claimed in claim 1, wherein the belt adapter has two adapter plates which may be arranged on the sides of the belt end remote from one another.

4. The belt lock as claimed in claim 1, wherein the adapter plate is configured as a bar-shaped adapter plate which may be secured to the belt end, and a bar being able to be arranged thereon.

5. The belt lock as claimed in claim 1, wherein the upper and lower part and the at least one adapter plate have recesses which are aligned with one another for arranging fastening means.

6. The belt lock as claimed in claim 1, wherein the belt adapter comprises a clamping plate, the adapter plate being able to be clamped thereby to the belt end and/or the connecting piece.

7. The belt lock as claimed in claim 1, wherein the belt adapter has at least one tooth element facing in the direction of a belt end to be arranged.

8. The belt lock as claimed in claim 1, wherein the belt adapter has a recessed region for receiving the connecting piece.

9. The belt lock as claimed in claim 1, wherein the belt adapter has a recessed region for receiving the belt.

10. The belt lock as claimed in claim 1, wherein the belt adapter has a curved end.

11. The belt lock as claimed in claim 1, wherein the hinge region is configured without a bushing.

12. The belt lock as claimed in claim 1, wherein the connecting pieces are configured as F-type connecting pieces.

13. A belt for an agricultural implement, the belt comprising:
   a belt lock as claimed in claim 1, wherein a belt end of the belt is fastened between the upper and lower part of the belt lock, and wherein the two connecting pieces of the belt lock are connected together via a bar end.

14. The belt as claimed in claim 13, wherein:
   a respective screening bar is arranged between a respective belt end and a respective upper adapter plate, the belt having a longitudinal direction, and along the longitudinal direction of the belt, a length of the belt adapter is less than spacing between two successive screening bars.

* * * * *